US006412270B1

(12) United States Patent
Mortzheim et al.

(10) Patent No.: US 6,412,270 B1
(45) Date of Patent: Jul. 2, 2002

(54) APPARATUS AND METHODS FOR FLOWING A COOLING OR PURGE MEDIUM IN A TURBINE DOWNSTREAM OF A TURBINE SEAL

(75) Inventors: Jason Paul Mortzheim, Niskayuna, NY (US); Ming Zhou, Reading, MA (US); Paul Thomas Marks, Scotia, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/682,510

(22) Filed: Sep. 12, 2001

(51) Int. Cl.$^7$ .................................................. F02C 5/00

(52) U.S. Cl. ...................... 60/39.02; 60/39.75; 415/144

(58) Field of Search .......................... 415/144; 60/39.02, 60/262, 39.75, 39.83

(56) References Cited

U.S. PATENT DOCUMENTS 4,631,914 A * 12/1986 Hines .......................... 60/262
4,653,267 A * 3/1987 Brodell et al. ............. 60/39.02
6,298,656 B1 * 10/2001 Donovan et al. ........ 60/39.182

* cited by examiner

*Primary Examiner*—Charles G. Freay
(74) *Attorney, Agent, or Firm*—Patrick K. Patnode; Christian G. Cabou

(57) ABSTRACT

Leakage flows through seals are used to cool components of a turbine downstream of the seals. At certain seal locations, the leakage flows are restricted to the extent that cooling of downstream components cannot be effected by the leakage flows. The cooling air leakage flow is augmented by extracting bleed air from different stages at different temperatures from a compressor and combining the extracted flows in an ejector to provide a flow having a temperature intermediate the temperatures of the extracted flow streams for augmenting the leakage flow to cool the component. The ejector thus uses high extraction air to entrain lower temperature extraction air to lower the ejector exit air temperature, reducing the magnitude of air required to cool the downstream component and enhancing the effectiveness of the advanced seal.

5 Claims, 3 Drawing Sheets

APPARATUS AND METHODS FOR FLOWING A COOLING OR PURGE MEDIUM IN A TURBINE DOWNSTREAM OF A TURBINE SEAL

BACKGROUND OF INVENTION

The present invention relates to a cooling system for a gas turbine for cooling a component of the turbine downstream of a seal and which seal restricts the cooling flow to the component sufficiently to adversely affect the component and particularly relates to apparatus and methods for augmenting the cooling flow to the downstream component.

In gas turbines, a portion of the total air flow from the compressor inlet is diverted to various turbine components for purposes of cooling or providing purge flow to those components. The diverted air can consume a large proportion of the total air flow, for example, as much as 20%. The management and control of these parasitic flows, for example, through the use of advanced seals, can dramatically increase the performance of the turbine. Typically, air under pressure is extracted from the compressor and bypasses the combustion system of the turbine for use as a cooling or purge flow for various turbine components. A cooling flow inevitably flows past seals between relatively movable components. For example, labyrinth seals between rotatable and stationary components are often employed and leakage flows past the labyrinth seals have been used for cooling certain turbine components downstream of the seals. As a specific example, the high packing seal is typically a labyrinth seal and the cooling air leakage flow past that seal is used to purge the downstream wheelspace, as well as to cool the rotor.

With the advent of advanced seals, such as combined labyrinth/brush, a bradable or certain labyrinth seals, used in place of the more conventional seals, the advanced seals may restrict the leakage flow past the seals, to the extent that such leakage flows can no longer provide the necessary cooling or purge flow to the downstream components. That is, advanced seals are designed for the very desirable effect of increasing sealing capacity. However, in some locations the flows in which the seals are to restrict are used for cooling or providing purge flow to turbine components downstream of the seals. If the magnitude of the flow restricted by the advanced seal is too great, the designed temperature limits of the downstream component may be exceeded. Conventional labyrinth seals, for example, do not typically restrict the leakage flow sufficiently to cause high temperatures in the downstream temperature components, i.e., they do not restrict the flow sufficiently to cause the component to approach or exceed its designed temperature limits. Advanced seals which are being increasingly used in turbines in lieu of the more conventional seals, however, may restrict leakage flows sufficiently such that the temperature of the component may approach or exceed its designed temperature limit.

SUMMARY OF INVENTION

In an embodiment of the present invention, an ejector is employed which uses a primary driving or motive fluid to entrain a lower temperature fluid and thus drop the temperature of the combined fluid. The combined fluid is used to augment the cooling or purge flow to the downstream component. Because of the lower temperature, the amount of fluid required, e.g., to cool the downstream component, is reduced and the advanced seal becomes more effective. Particularly, the motive fluid may comprise an extraction from the compressor which is mixed in the ejector with a suction fluid from an earlier lower pressure and temperature stage of the compressor. By accelerating the motive fluid, dropping its static pressure and combining the motive fluid with the suction fluid and passing the combined flow through a diffuser, the resulting flow is at a temperature intermediate the extraction air temperatures. By using this lower temperature air augmentation, less air is needed to maintain the desired temperature limit and thus advanced seals can be used in locations where individually they would cause excessive temperatures in the component due to the restricted air flow. Also, less of the more valuable later compressor air and more of the less valuable earlier compressor air are used to cool or provide purge flow to the downstream component. The cooling flow is thus minimized and improved performance is achieved without sacrificing part life.

In a preferred embodiment according to the present invention, there is provided a method of cooling a component of a turbine or providing a purge flow to a space downstream of a seal comprising the steps of restricting a supply of cooling or purge air flowing past the seal to the downstream component such that a predetermined temperature limit of the downstream component or space is exceeded, extracting a first flow of air from a stage of a compressor associated with the turbine at a first temperature, extracting a second flow of air from another stage of the compressor at a second temperature lower than the first temperature and combining the first and second flows with one another to provide a third flow of air to the component or space at a temperature intermediate the first and second temperatures to cool the component to or provide purge flow to the space at a temperature below the temperature limit.

In a further preferred embodiment according to the present invention, there is provided a cooling system for a turbine comprising a turbine seal, a turbine component and a passage in the turbine for carrying cooling medium past the seal along the passage to the component, the seal restricting the flow of the cooling medium along the passage to the component such that a temperature limit of the component is exceeded, a first flow path for flowing cooling medium from a pressure stage of a compressor associated with the turbine at a first temperature, a second flow path for flowing cooling medium from a stage of the compressor at a second temperature lower than the first temperature and an ejector for mixing together the flows of cooling medium from the first and second flow paths to provide a mixed flow having a temperature intermediate the temperatures of the flows along the first and second flow paths and a passageway for receiving the mixed flow and combining the mixed flow and the flow of cooling medium along the passage for cooling the component.

DETAILED DESCRIPTION

Figure 1:
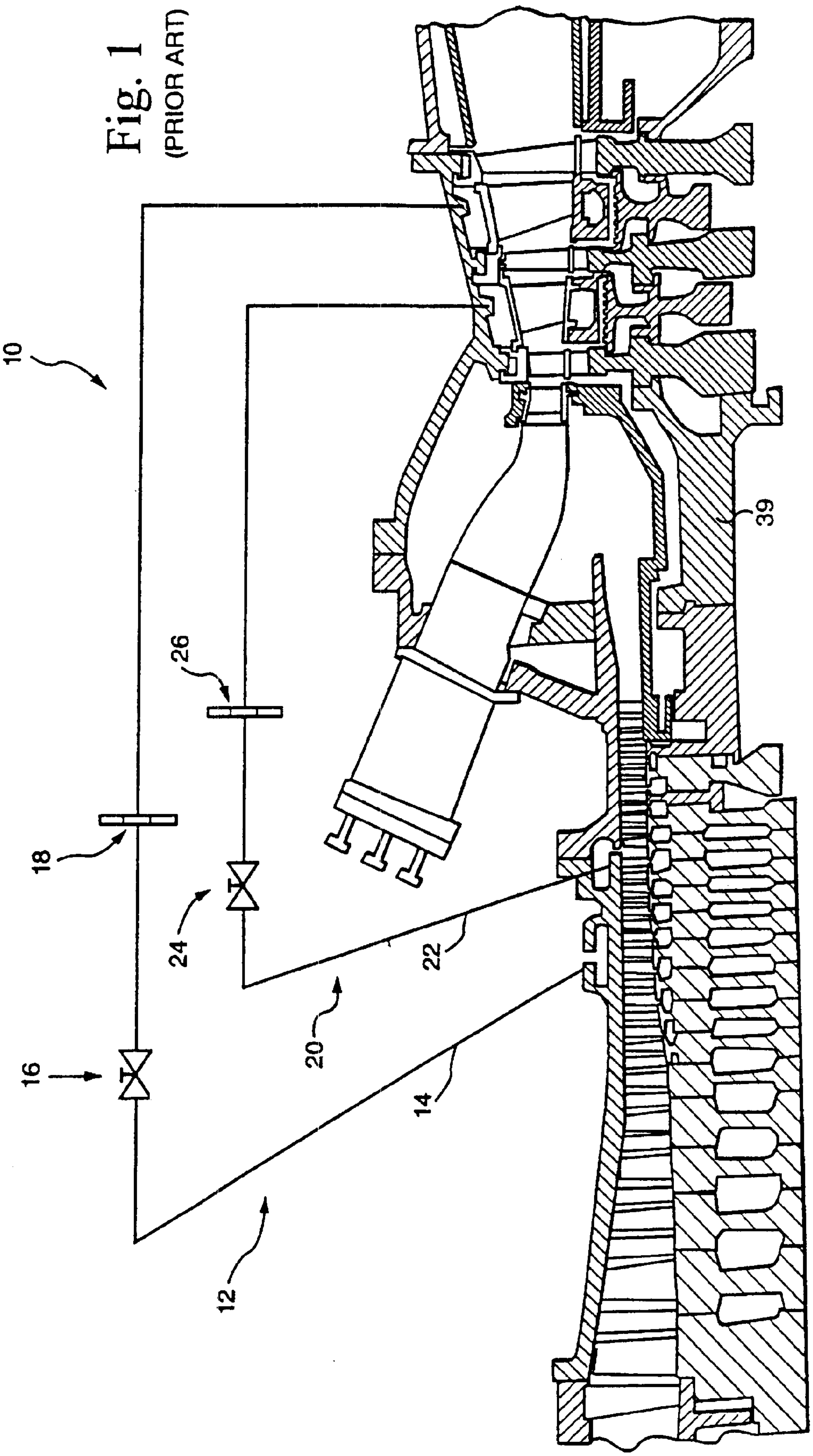
Fig. 1 (PRIOR ART)
FIG. 1 is a schematic illustration of a gas turbine with conventional compressor extraction circuits.

Referring now to FIG. 1, there is illustrated a gas turbine with a conventional compressor extraction circuit 10. As illustrated, a low extraction circuit 12 and an intermediate pressure extraction circuit 20 are typically provided. In this illustrated system, the low extraction line 14 includes a control valve 16 for flow control and an orifice 18 for pressure dissipation. The intermediate pressure extraction line 22 similarly includes a control valve 24 and an orifice 26 for pressure dissipation.

Figure 2:
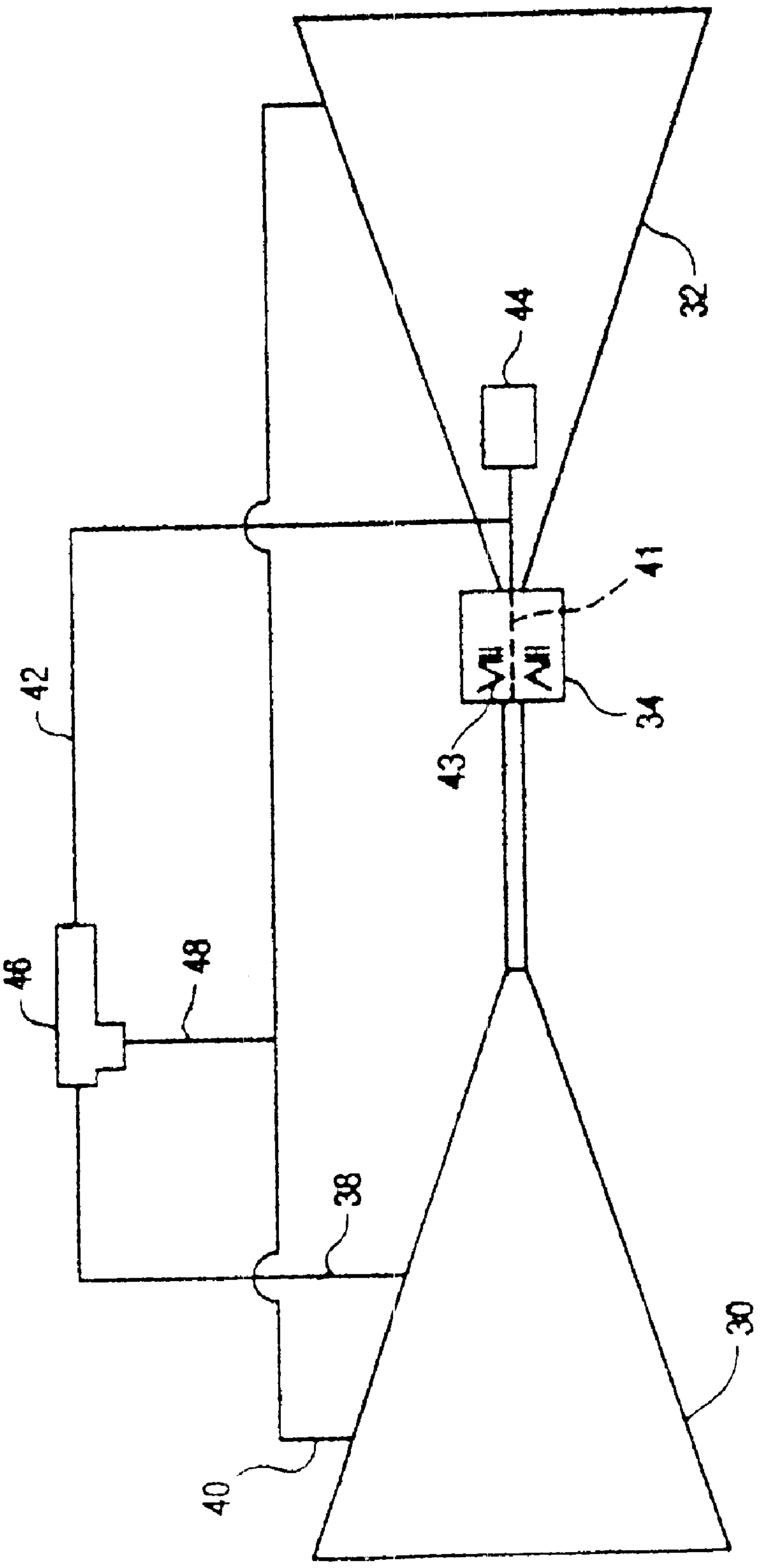
FIG. 2 is a schematic of a gas turbine having an advanced seal and a downstream component cooled by combined leakage and extraction flows.

Referring now to the schematic illustration of FIG. 2, which shows an embodiment of the present invention, there is illustrated a compressor 30 and a turbine 32 associated with the compressor 30. A seal 34 is associated with the turbine and may comprise any seal in the turbine which seals between relatively movable components and affords a leakage flow for cooling or providing a purge flow past a component 44 downstream from the seal. As a specific example, the seal 34 may comprise a high packing seal and the downstream component 44 which may be cooled by the leakage flow past the seal 34 may include the turbine rotor 39 (FIG. 1) or comprise a purge flow into the rotor wheel space. In the present invention, a passage 41 carries a cooling medium past the seal 34, which may comprise an advanced seal of a type employing combined labyrinth/brush seals 43, and which seal 34 restricts leakage flow through the seal to the extent that the downstream component desired to be cooled may not be cooled below a predetermined temperature limit. That is, because of the improved sealing capacity, i.e., the further restriction of the flow of leakage air, the downstream component 44 cannot be sufficiently cooled or the space cannot be adequately purged. Such advanced seals, e.g., may comprise a combination labyrinth/brush seal, a brush seal or certain labyrinth seals, and, as a further representative example, may be employed as a high pressure packing seal or an interstage seal. To provide adequate cooling to and preclude overheating of the downstream component, the leakage cooling air flow is augmented by a flow at a lower temperature than would otherwise be the case if a conventional seal with significant leakage flow was utilized in lieu of the advanced seal 34.

To accomplish this and referring to FIG. 2, a first bleed air flow 38 for flow along a first flow path is extracted from a stage of the compressor 30 at a first temperature and pressure. A second bleed air flow 40 for flow along a second flow path is extracted from a compressor stage at a lower temperature and pressure than the temperature and pressure of the extraction air flow 38. The first bleed air flow may be used to cool one or more turbine components 44. The second bleed air flow 40 may be used to cool turbine components such as the third nozzle or provide a purge flow. It will be appreciated that the first extraction air flow 38 is thus taken from a higher temperature and pressure stage of the compressor, for example, the thirteenth stage, than the second extraction air flow 40. The latter may be taken, for example, from the ninth compressor stage and a portion of the flow 40 is provided via flow 48 to an ejector 46 as described below. These extraction flows 38 and 48 are combined to provide a third flow 42 along a third flow path which is at a temperature intermediate the temperature of the first and second flows 38 and 40. The third, i.e., combined, flow 42 is disposed in a third flow path downstream of the advanced seal 34 and upstream of the component 44 desired to be cooled such that the temperature limits of the component 44 are not exceeded. Thus, the seal 34 which may otherwise restrict the supply of cooling leakage flow to the component 44 such that the temperature limits of the component would be approached or exceeded, is augmented with cooling air flow via line 42 to maintain the downstream component within its temperature limits.

Figure 3:
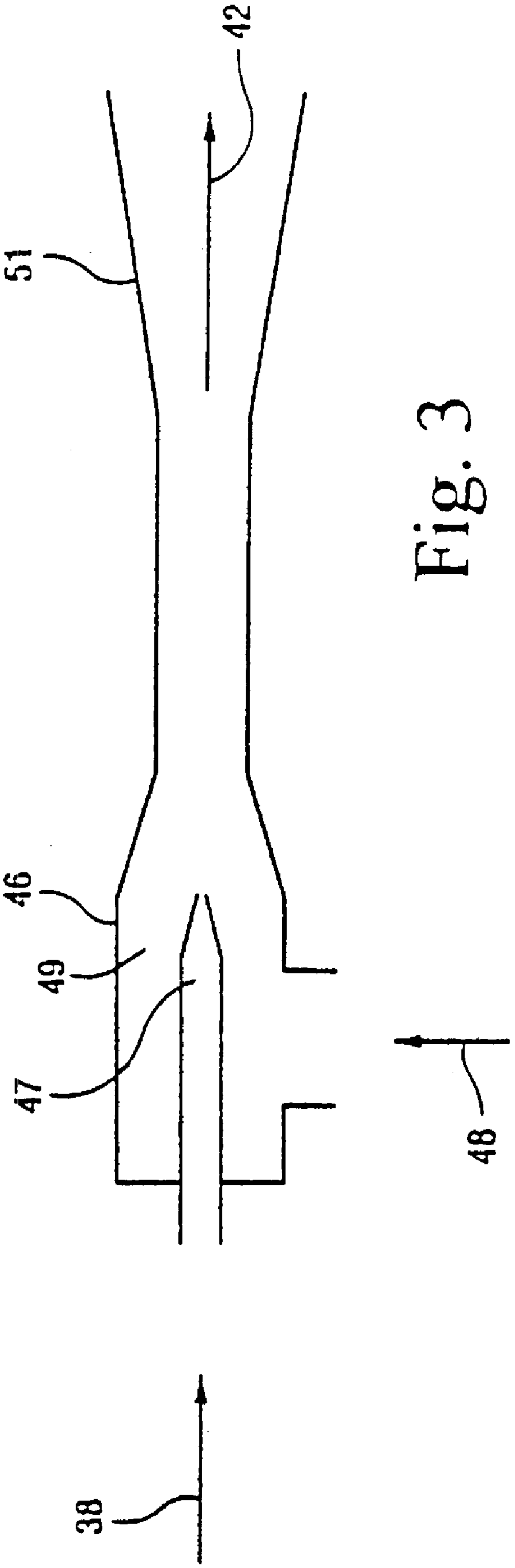
FIG. 3 is a schematic view illustrating an ejector.

More particularly, an ejector 46 is employed. Ejectors are conventional devices typically used to boost low pressure streams to higher, more usable pressures, thereby effectively utilizing available energy without waste. The motive or primary nozzle 47 (FIG. 3) of ejector 46 receives the high temperature extraction flow 38 or a portion thereof. The lower pressure, lower temperature extraction flow 48 is supplied to the suction side of the ejector for flow through the secondary or suction nozzle 49. The high flow into ejector 46 via flow 38 is accelerated in the primary nozzle 47 of ejector 46, lowering its static pressure. The lower pressure flow via line 48 serves as the flow suctioned through the secondary nozzle 49, following which the two flows are combined and passed through a diffuser 51. The mixed flow 42 exiting the diffuser is therefore at a lower temperature than the temperature of the first flow 38 and at a higher temperature than the second flow 48. Because of the deceleration of the combined flows through the diffuser 51, static pressure is also recovered.

By using this lower temperature air, less air is needed to maintain the temperature of the downstream component below its temperature limit. Consequently, seals, and particularly advanced seals, which may restrict the cooling leakage flow to such an extent that downstream components cannot be cooled below predetermined temperature limits, can be used in such locations as augmented by the reduced temperature combined flow 42 from the ejector. Thus, the flow is minimized, resulting in improved performance. Also, the augmentation is provided in part by the less valuable lower temperature air extracted from the compressor.

Further, from a review of FIG. 2, it will be appreciated that the cooling or purge flow is external to the turbine. Consequently, the cooling or purge flow can be optimized during turbine operation. For example, where extra compressor discharge air passes through conventional fixed sized holes in a compressor discharge casing bypassing the advanced seals, and as the seals wear, the magnitude of the cooling or purge flow can be adjusted by using control valves, not shown, in the bypass flow.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of cooling a component of a turbine or providing a purge flow to a space downstream of a turbine seal comprising the steps of:

restricting a supply of cooling or purge air flowing past the seal to the downstream component such that a predetermined temperature limit of the downstream component or space is exceeded;

extracting a first flow of air from a stage of a compressor associated with the turbine at a first temperature;

extracting a second flow of air from another stage of the compressor at a second temperature lower than said first temperature; and combining the first and second flows with one another to provide a third flow of air to the component or space at a temperature intermediate said first and second temperatures to cool the component to or provide purge flow to the space at a temperature below the temperature limit.

2. A method according to claim 1 wherein the step of combining includes accelerating said first flow through a nozzle, suctioning said second flow and mixing the accelerated and suctioned flows together.

3. A method according to claim 1 wherein said seal comprises a combined labyrinth and brush seal and said component includes portions of the rotor.

4. A cooling system for a turbine comprising:

a seal, a turbine component and a passage in the turbine for carrying cooling medium past said seal to said component, said seal restricting the flow of the cooling medium along the passage to the component such that a temperature limit of the component is exceeded;

a first flow path for flowing cooling medium from a pressure stage of a compressor associated with the turbine at a first temperature;

a second flow path for flowing cooling medium from a stage of the compressor at a second temperature lower than the first temperature; and an ejector for mixing together the flows of cooling medium from said first and second flow paths to provide a mixed flow having a temperature intermediate the temperatures of the flows along the first and second flow paths and a passageway for receiving the mixed flow and combining the mixed flow and the flow of cooling medium along said passage for cooling the component.

5. A cooling system according to claim 4 wherein said ejector includes a primary nozzle for receiving the cooling medium flowing along said first flow path, a suction nozzle for receiving the cooling medium along said second flow path and a diffuser for receiving the cooling mediums from said primary nozzle and said suction nozzle for decelerating the mixed flow and recovering static pressure.

* * * * *